United States Patent [19]

Allen

[11] 4,042,254
[45] Aug. 16, 1977

[54] AUTOMOBILE HITCH COUPLER AID

[76] Inventor: Gordon L. Allen, 12994 Cherry Lane, Chesterland, Ohio 44026

[21] Appl. No.: 681,578

[22] Filed: Apr. 29, 1976

[51] Int. Cl.² ............................................. B60D 1/14
[52] U.S. Cl. .................................. 280/478 B; 280/477
[58] Field of Search ............... 280/477, 478 R, 478 A, 280/478 B

[56] References Cited

U.S. PATENT DOCUMENTS

| | | | |
|---|---|---|---|
| 2,150,010 | 3/1939 | Solomon | 280/477 |
| 3,761,113 | 9/1973 | Smithermann | 280/478 R |
| 3,774,943 | 11/1973 | Schmiesing | 280/478 B X |

Primary Examiner—Joseph F. Peters, Jr.
Assistant Examiner—R. Schrecengost
Attorney, Agent, or Firm—Baldwin, Egan, Walling & Fetzer

[57] ABSTRACT

An automobile hitch coupler aid is provided for hitching together two vehicles wherein the complementary coupling members are not easily brought into exact registration. The device comprises a female hollow pyramidal member having structure for mounting this member on one of the vehicles with a male pyramidal member having an outer surface substantially complementary to the inner surface of the female pyramidal member adapted to move between a closely nested position in the female member and a separated position which permits movement of the male pyramidal member relative to the female pyramidal member in any direction. To manipulate the two pyramidal members, a flexible member such as a chain or cable has one end fixed to the narrower end of the male pyramidal member and which then passes outwardly through the narrower end of the female pyramidal member and a device preferably carried on the outer wall of the female pyramidal member is connected with the other end of the flexible member for winding up and paying out the flexible member in operation of the device.

2 Claims, 7 Drawing Figures

U.S. Patent Aug. 16, 1977 4,042,254
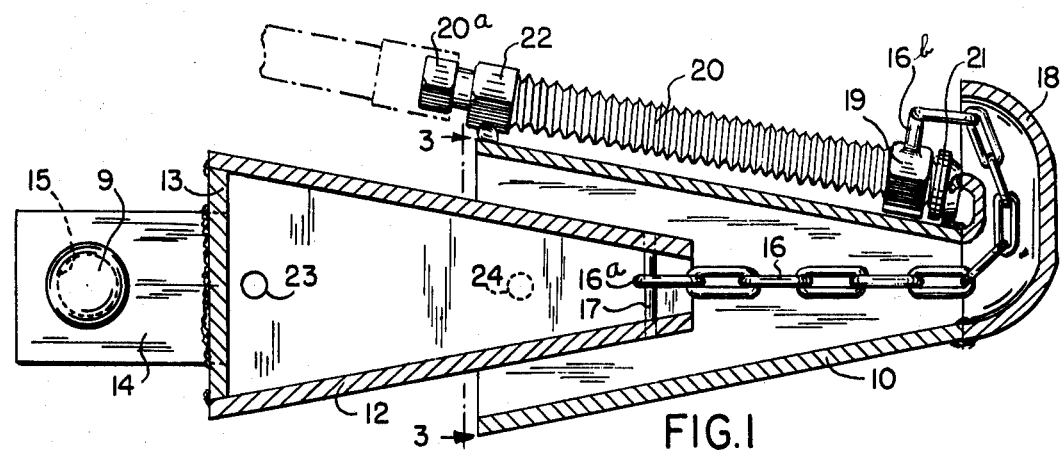
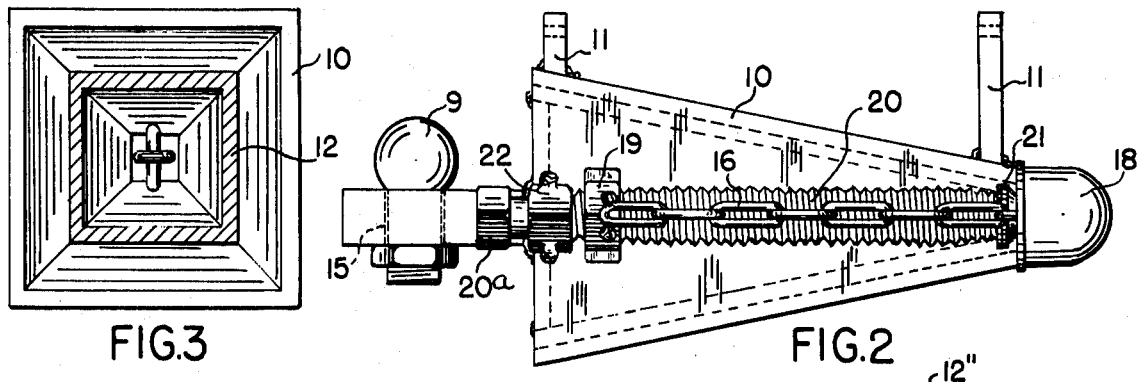
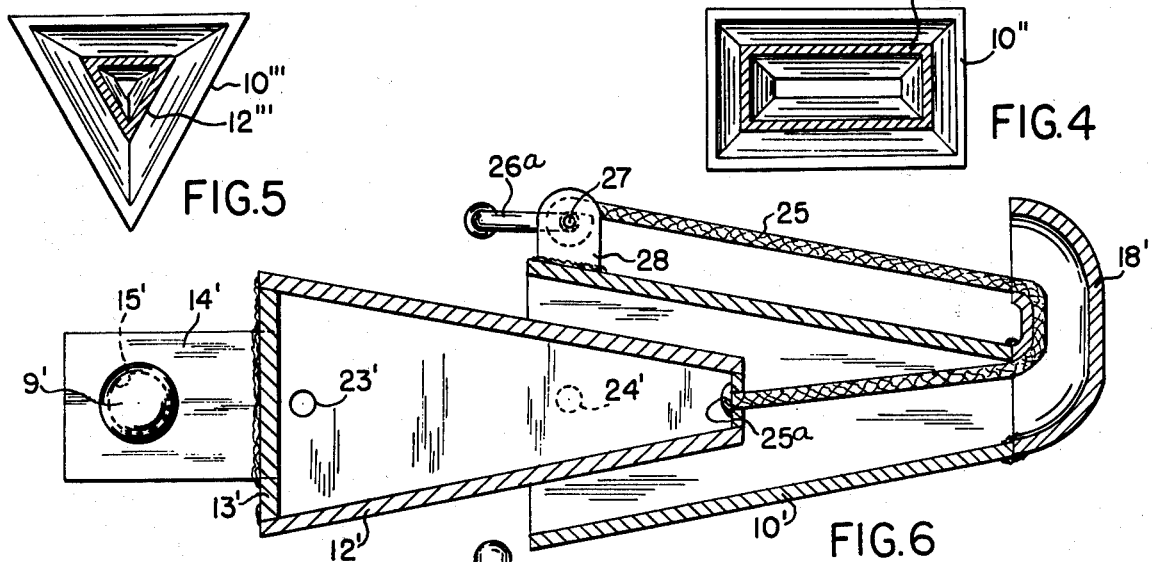
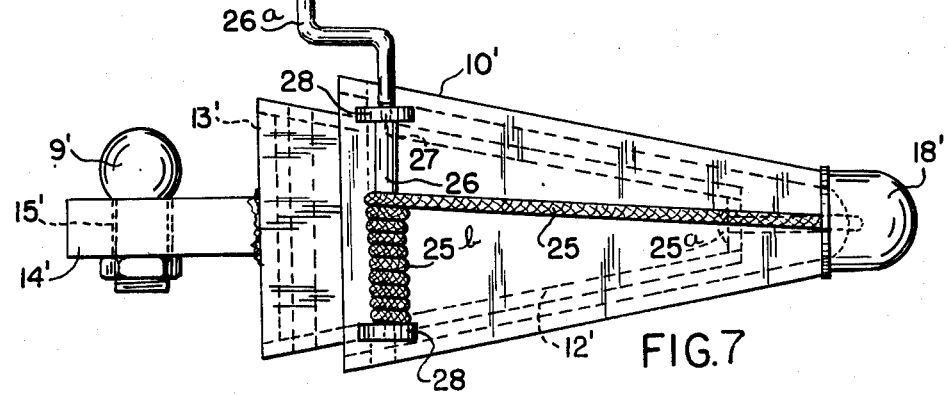

AUTOMOBILE HITCH COUPLER AID

BACKGROUND OF THE INVENTION

Those who have coupled up two vehicles for towing of one by the other are aware of the problem of getting the hitch components in substantially exact registration so as to firmly tighten up the hitch. These hitch components are usually either a standard ball and socket arrangement or a ring and pin joint, but any other standard hitching device may be used with the present invention. If two people are available for the coupling operation, one may manipulate one of the vehicles while the other member of the team stands by the coupling components and signals to the driver of the vehicle the movements necessary to bring the two hitching members in exact registration. However, when only one person is present, or if both of the vehicles are too heavy to be easily moved around by one person, then this invention becomes very important.

An object of the present invention is to provide mating preferably rectangular pyramidal shapes which nest one into the other, with means for fastening one of the pyramidal members to one vehicle and means for moving the male member of the nesting pyramidal members relative to the female member to enable the coupling of the hitching components, after which a flexible member is arranged in such a manner as to draw the male pyramidal member into the female pyramidal member until the pyramidal members are closely nested, after which preferably a locking pin is dropped into position to hold the coupling tight together during the towing operation.

Other bjects and advantages of the present invention will be apparent from the accompanyiny drawings and description and the essential features will be set forth in the appended claims.

In the drawings,

FIG. 1 is a central sectional view through two coacting reactangular pyramidal members in a relaxed position if the two pyramidal members;

FIG. 2 is a side elevational view of the structure shown in FIG. 1 with the pyramidal members in completely nested position;

FIG. 3 is a sectional view taken along the line 3—3 of FIG. 1;

FIG. 4 is a view similar to FIG. 3 showing how the two rectangular cones need not necessarily have a square base;

FIG. 5 is another view taken in a position similar to FIG. 3 and showing how two triangular base pyramidal members may be used to carry out this invention; while FIGS. 6 and 7 are respectively top plan views and side view of another modification using a cable as the flexible coupling member as opposed to the claim shown in FIGS. 1 and 2.

Referring now to FIGS. 1, 2 and 3, a female hollow square pyramidal member 10 is shown having integral members 11 attached whereby to fasten the pyramidal member 10 to one of the two vehicles. The term pyramidal member as used herein in the specification and claims is intended to include an almost complete pyramidal form with just room to connect the flexible member as shown in FIGS. 1, 2, 6 and 7, or to include a frustrum of a true pyramid as shown in the drawings. A male pyramidal member 12 is provided having an outer surface substantially complementary to the inner surface of the female pyramidal member so that the male member may fit into a closely nested position as shown in FIG. 2 or in a separated position as shown in FIGS. 1 and 3 whereby to permit movement of the male pyramidal member relative to the female pyramidal member in any direction. The male pyramidal member 12 is here shown as hollow but it could be a solid member which would only add to the weight which is unnecessary. The outer end of the male pyramidal member 12 is closed by a plate 13 and is welded in the position shown in FIG. 1. Rigidly attached to the plate 13 is a projection 14 which has a through opening 15 to which may be attached a ball of a standard ball and socket hitch as seen in FIG. 2.

An elongated flexible member 16, shown in FIGS. 1 and 2 as a link chain 16, has one end 16a attached over a pin 17 mounted in the walls of the male pyramidal member 12. The chain 16 passes out the narrower end of the female pyramidal member 10 and conveniently a guiding channel 18 is affixed to the narrower end of the female pyramidal member as shown in FIGS. 1 and 2 to guide the chain for an approximately 180° turn as the chain leaves the narrower end of the female pyramidal member 10. The other end of the chain 16, at 16b, is rigidly attached to a nut 19 which is threaded on a linear screw 20 which is rotatable at the right-hand end as seen in FIG. 1 in a socket 21 and which passes through a bearing member 22 at the left-hand end as seen in FIG. 1 so that a wrench applied to the non-circular end 20a of the screw 20 will cause the nut 19 to travel along the screw 20 to wind up or pay out the flexible member 16 as described herein. The arrangement shown in the drawings is such that the chain 16 prevents any substantial rotation of the nut 19 and, therefore, the nut is caused to travel along the screw 20. The parts are so proportioned as to permit movement of the male member 12 between a closely nested position as shown in FIG. 2 and a separated position which could be as shown in FIGS. 1 and 3 or the male member could move even further out of the female member 10.

Preferably, means is provided for locking the two pyramidal members together in a nested position. This is here shown as two through openings 23 in the male member 12 and two through openings 24 in the female member 10 and these sets of openings come into registration when the parts are fully nested as shown in FIG. 2 and a locking pin may then be passed through the aligned openings to firmly lock the towing parts together during a towing operation of the two vehicles.

The pyramidal members shown in FIGS. 1, 2 and 3 have square bases. As shown in FIG. 4, the bases could be rectangular so that the male pyramidal member could not rotate so that the two pyramidal members would always have the longer sides adjacent to each other as shown in FIG. 4. Otherwise the structure would be the same as that already described.

FIG. 5 shows that triangular pyramids could be joined together as already described to carry out this invention and preferably with the sides of the two pyramidal members so designed that the male member will always have the same sides adjacent similar sides of the female member as shown in FIG. 5. A modification is shown in FIGS. 6 and 7 where all the structures are substantially like those shown in FIGS. 1, 2 and 3 and parts having the same function are given the same reference characters with a prime suffix. The only difference between the second embodiment and the first is that the flexible member 16 in the first embodiment is now replaced by a flexible cable 25 which has one end 25a permanently secured to the narrower end of the male pyramidal member 12', the cable extending around the structure 18' and then outwardly along the outside of the female pyramidal structure 10', the cable having its other end 25b secured to the mandrel 26 of a winch 27 which is mounted for rotation at 28 on the outer face of the female pyramidal member 10'. The mandrel 26 may have attached to it a crank arm 26a as shown in FIGS. 6 and 7 whereby the operator may wind up or pay out the cable 25 to manipulate the male pyramidal member 12' between a closely nested position in the female pyramidal member 10' or to a separated position which permits movement of the male pyramidal member relative to the female pyramidal member in any direction as previously described in conection with FIGS. 1, 2 and 3.

In the use of this device, the female pyramidal portion 10, 10', 10'' or 10''', would be securely fastened to the towing vehicle. The towing vehicle is then backed up to the other vehicle so that the hitch component 9 or 9' is within a few inches of registration with the complementary hitch component on the unit to be towed. The operator of the present invention can then extend the male pyramidal member out of the female pyramidal member by turning the threaded shaft 20, or the winch 27, which in turn slackens the chain 16 or the cable 25 which is fastened to the male pyramidal member 12 or 12'. The operator can then move the male pyramidal member in any direction relative to the corresponding female pyramidal member so as to register the ball member 9 or 9' in registration with the socket (not shown) on the other vehicle. He then connects the hitch components together and the final coupling is then completed by the operator turning the threaded shaft 20 or the winch 27 to draw the male pyramidal member back into the female pyramidal member to a nested position and then slipping a locking pin through the registering openings 23 and 24.

I intend the word automobile as used in the specification and claims to include trucks.

What is claimed is:

1. An automobile hitch coupler aid comprising a female hollow pyramidal member, means for mounting said member on a vehicle, a male pyramidal member having an outer surface substantially complementary to the inner surface of said female pyramidal member, an elongated flexible member having one end fixed to the narrower end of said male pyramidal member and passing outwardly through the narrower end of said female pyramidal member, and means comprising a nut attached to said other end of said flexible member and a linear screw on which said nut is threaded, said screw mounted on said outer wall of said female pyramidal member for rotation about the axis of said screw carried on the outer wall of said female pyramidal member connected with the other end of said flexible member for winding up and paying out said flexible member, and said attachment between said nut and said flexible member preventing any substantial rotation of said nut, the parts being so proportioned as to permit movement of said pyramidal members between a closely nested position and a separated position permitting movement of said male pyramidal member relative to said female pyramidal member in any direction.

2. An automobile hitch coupler aid as defined in claim 1 wherein said flexible member is a link chain.

* * * * *